United States Patent [19]

Walba

[11] Patent Number: 4,556,727

[45] Date of Patent: Dec. 3, 1985

[54] FERROELECTRIC SMECTIC LIQUID CRYSTALS

[75] Inventor: David M. Walba, Boulder, Colo.

[73] Assignee: University Patents, Inc., Westport, Conn.

[21] Appl. No.: 632,140

[22] Filed: Jul. 18, 1984

[51] Int. Cl.[4] .......................... C09K 3/34; G02F 1/13; C07C 69/773; C07C 69/78

[52] U.S. Cl. .................. 560/73; 252/299.01; 252/299.5; 252/299.67; 350/350 S; 560/72; 568/608

[58] Field of Search ............... 560/73, 72; 252/299.67, 252/299.5, 299.01; 350/350 S

[56] References Cited

U.S. PATENT DOCUMENTS

| | | | |
|---|---|---|---|
| 3,876,286 | 4/1975 | Deutscher et al. | 252/299.67 |
| 4,002,670 | 1/1977 | Steinstrasser | 252/299.67 |
| 4,005,064 | 1/1977 | Dietrich et al. | 252/299.68 |
| 4,083,797 | 4/1978 | Oh | 252/299.64 |
| 4,147,651 | 4/1979 | Oh | 252/299.66 |
| 4,158,011 | 6/1979 | Inukai et al. | 252/299.67 |
| 4,195,916 | 4/1980 | Coates et al. | 252/299.01 |
| 4,257,911 | 3/1981 | Gray et al. | 252/299.66 |
| 4,374,748 | 2/1983 | Inukai et al. | 252/299.66 |

FOREIGN PATENT DOCUMENTS

| | | | |
|---|---|---|---|
| 58981 | 9/1982 | European Pat. Off. | 252/299.5 |
| 2516515 | 10/1975 | Fed. Rep. of Germany | 252/299.01 |
| 3408708 | 9/1984 | Fed. Rep. of Germany | |
| 58-29877 | 2/1983 | Japan | 252/299.67 |

OTHER PUBLICATIONS

Gasanov, V. S., et al., Zh. Org. Khim, vol. 19(6), pp. 1203–1207, (1983).

C.A., vol. 96, 133710k, (1982).

*Primary Examiner*—Teddy S. Gron
*Attorney, Agent, or Firm*—George M. Yahwak

[57] ABSTRACT

Ferroelectric (chiral) smectic liquid crystal compounds having an achiral core and chiral tail units derived from lactic acid possess the desired combination of properties temperature range, ferroelectric polarization, and low orientational viscosity. These newly made compounds exhibit high speed, multistate electro-optic switching properties which make them ideally suited to certain electro-optic and display device applications.

16 Claims, No Drawings

FERROELECTRIC SMECTIC LIQUID CRYSTALS

This invention was made with partial Government support under Grant No. DMR-82-19529 awarded by the National Science Foundation. The Government has certain rights in this invention.

Liquid crystals have found use in a variety of electro-optical and display device applications, in particular those which require compact, energy efficient, voltage-controlled light valves such as watch and calculator displays. These devices are based upon the dielectric alignment effects in nematic, cholesteric, and smectic phases of the crystal compound in which, by virtue of the dielectric anisotropy, the average molecular long axis of the compound takes up a preferred orientation in an applied electric field. Since the coupling of an applied electric field by this mechanism is rather weak, thereby providing the energy efficiency for these devices, the resultant electro-optical response time for these devices is too slow for many other potential applications.

Liquid crystal displays have a number of unique characteristics, including low voltage and low power of operation, which makes them perhaps the most promising of the non-emissive electro-optical display candidates available with today's technology. However, the slow response and insufficient nonlinearity in liquid crystal displays have been serious limitations to many potential applications. The lack of speed becomes especially important in proportion to the number of elements that have to be addressed in a device; this results in increasingly impractical production costs for the potential use of such devices in flat-panel displays for use in video display terminals, oscilloscopes, radar, and television screens.

It has recently been shown (see N. A. Clark and S. T. Lagerwall, Appl. Phys, Lett. 36:899 (1980), and U.S. Pat. No. 4,367,924) that electro-optic effects with submicrosecond switching speeds are achievable using the technology of ferroelectric liquid crystals. Some ferroelectric liquid crystal display structures, in addition to the high speed (about one thousand times faster than currently used twisted nematic devices) reported by these investigators, exhibit bistable, threshold sensitive switching, making them potential candidates for matrix addressed light valves containing a large number of elements for passive displays of graphic and pictorial information, as well as for optical processing applications.

A basic requirement for application of ferroelectric liquid crystals in such devices is the availability of chemically stable liquid crystal compounds which exhibit ferroelectric phases over a substantial temperature range about room temperature. Ideally, these compounds, which must be chirally asymmetric to be ferroelectric, would exhibit a large ferroelectric dipole density, ($P_o$) in order to optimize coupling to an applied electric field, and a low orientational viscosity ($V_o$) in order to optimize response times.

Prior to the present invention, there have been no reported ferroelectric liquid crystals which satisfy these requirements. This lack of appropriate materials has been, in fact, the major obstacle to the timely development of ferroelectric liquid crystal displays. Presently available materials having the desirable electro-optic properties either require elevated temperatures of up to 150° C., exhibit ferroelectric phases only over a narrow temperature range, or are chemically unstable. These properties make such materials impractical in device applications in each of these instances.

Accordingly, it is an object of the present invention to describe a class of chirally asymmetric liquid crystal having ferroelectric phases over a substantial temperature range about room temperature.

A further object of the present invention is to describe a class of chirally asymmetric liquid crystals having large ferroelectric dipole density and low orientational viscosity.

A still further object of the present invention is to disclose a class of compounds by which enantiomerically enriched units may be incorporated into the molecular framework of chirally asymmetric liquid crystals.

These and other objects and advantages of the present invention will become more apparent, and more readily appreciated from the following detailed description of the presently preferred exemplary embodiments of the present invention.

The chirally asymmetric liquid crystal compounds of the present invention are formed by the incorporation of enantiomerically enriched tail units derived from readily available and inexpensive ethyl lactate into a liquid crystal molecular framework. More specifically, I have found the attachment of an enantiomerically enriched lactic acid derived tail unit to the para position of the phenyl group of a phenyl benzoate core unit will confer the desired properties of large ferroelectric dipole density and low orientational viscosity to the chirally asymmetric liquid crystal compound.

The intermediate compound by which the enantiomerically enriched units derived from lactic acid are incorporated into the liquid crystal molecular framework are also part of the present invention. More specifically, these are compounds of the general Formula I:

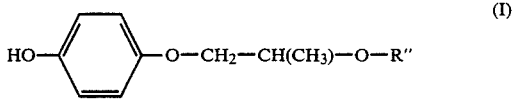
(I)

wherein R" may be any alkyl of one to twelve carbon atoms, for example, R" may be methyl, ethyl, propyl, butyl, pentyl, hexyl, heptyl, octyl, nonyl, decyl, undecy, or dodecyl radicals. Furthermore, in those instances when the alkyl radical may possess structural isomerism, such as in those alkyls having three or more carbon atoms, such isomers are also included within the R" definition of alkyl.

Although the intermediate compounds according to the present invention may be selected to contain a R" radical from a relatively large class of alkyl substituents, for purposes of the ferroelectric smectic liquid crystal compounds of the present invention R" is preferred to be an alkyl radical containing one to three carbon atoms.

The incorporation of enantiomerically enriched tail units derived from lactic acid into the liquid crystal molecular framework results in ferroelectric smectic liquid crystals of the general Formula II:

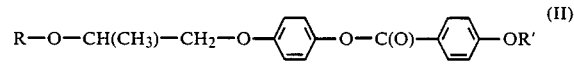
(II)

wherein R is a lower alkyl of one to three carbon atoms, and R' is an alkyl of nine to twelve carbon atoms.

The compounds according to the present invention are prepared following the general synthesis flow scheme shown below:

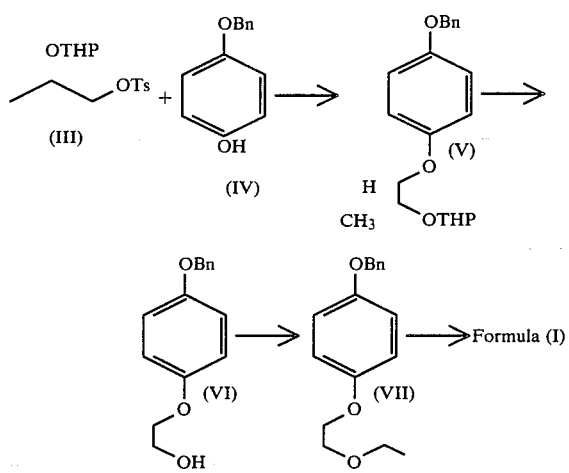

In this synthesis pathway, the following abbreviations are used:
THP=tetrahydropyranyl
Bn=benzyl
Ts=p-toluenesulfonate In general terms, this synthesis pathway involves the conversion of ethyl lactate to the protected tosylate of Formula III according to procedures previously reported by Ghjirardelli (JACS 95: 4987, 1973). The tosylate is then coupled with the known p-benzyloxphenol of Formula IV, and the synthesis completed as more fully described in the following examples.

The following examples and procedures are presented in order to provide a more complete understanding and illustration of the present invention.

EXAMPLE I

This example illustrates the procedure for coupling of the compounds of Formulas III and IV.

To a 250 ml three neck flask fitted with a magnetic stir bar and argon inlet was added 1.4 g of a 50% oil dispersion of sodium hydride (NaH) (29 mmol of NaH). The NaH was washed twice with dry n-pentane, then dried under a high flow of argon. Dimethylformamide(DMF, 100 ml) was then added to the flask via syringe, stirring was commenced, and 3.6 g (17.9 mmol) of p-benzyloxyphenol (the compound of Formula IV) was added via a powder funnel. The resulting reaction mixture is stirred for fifteen minutes, then a solution of tosylate (the compound of Formula III) (4.0 g, 14.0 mmol) in 50 ml of DMF was added to the mixture via syringe. After 48 hours, the DMF was removed by vacuum rotary evaporation. The resulting crude mixture was quenched with water (ice bath cooling), and the aqueous layer extracted several times with diethyl ether. The combined organic layers were dried over anhydrous magnesium sulfate, the ether removed by rotary evaporation, and the resulting crude product purified by flash chromatography on silica gel (85:15 hexanes/ethyl acetate) affording 4.0 g (85%) of pure compound 5: $^1$H NMR (CDCl$_3$) 1.23 (d) 1.35, 1.44–1.94 (THP), 3.45, 3.8–4.2 (m, alpha to oxygen), 4.7, 5, 7.2–7.55 (ArH); $^{13}$C 16.95, 17.34, 20, 20.69, 30.98, 61.95, 70.84, 71.39, 72.78, 98.6, 116.11, 127.5, 128, 136.39, 153.62; Mass spectrum 342.5 (25%), 90.1 (100%), 83.9 (79.7%); Combustion analysis C-73.55%, 0–18.6%.

EXAMPLE II

This example illustrates the procedure for the preparation of the compound according to Formula VI.

To a 100 ml round bottom flask equipped with a spiral condenser and magnetic stir bar was added 0.17 g of amberlite ion exchange resin (IR-120 H C.P., medium porosity, 20–50 mesh (wet)) and 50 ml of methanol. The reaction mixture was then heated with stirring to 45° C. using an oil bath and then 20 ml of a methanol solution of compound V (1.04 g, 3.05 mmol) was added via pipet. After 4 hours the mixture was allowed to cool, filtered, and the solvent removed by rotary evaporation, affording 0.67 g of (85% yield) compound VI. The product may be obtained analytically pure by flash chromatography on silica gel: white solid (mp 94.8–95.3); IR OH stretch 3275 cm$^{-1}$; $^1$H NMR (CDCl$_3$) 1.15 (d), 3.62 (m), 3.76 (d of d), 4.035, 4.89, aromatic splitting as before. $^{13}$C 18.97, 66.06, 70.79, 74.24, 115.98, 127.78, 127.97, 128.96, 137.38, 154.5; Mass spectrum 259 (16.8%), 258 (68.6%), 90.1 (100%), 59.5; Combustion analysis: C, 74.3%, H; 7.05%.

EXAMPLE III

This example illustrates the procedure for the preparation of the compound according to Formula VII.

To a 250 ml three neck flask fitted with a magnetic stir bar was added 1.0 g of a 50% oil dispersion of NaH (20.7 mmol of NaH). The NaH was washed twice with dry n-pentane, then dried under a high flow of argon. The flask was then charged with 60 ml of DMF (syringe), stirring commenced, and a solution of 2.15 g (8.3 mmol) of compound VI in 25 ml of DMF was added via syringe. The resulting reaction mixture was allowed to stir for fifteen minutes, then 0.906 ml of ethyl iodide (1.75 g, 11.25 mmol) was added via syringe. After 12 hours, the reaction solvent was removed by vacuum rotary evaporation, and the reaction mixture quenched by slow addition of water (ice bath cooling). The resulting aqueous mixture was extracted with several portions of diethyl ether and the combined organic extracts dried over anhydrous magnesium sulfate. Filtration and removal of solvents by rotary evaporation gave a crude product which was purified by column chromatography (9:1 hexanes/ethyl acetate) affording 1.95 g (82%) of compound VII as a white solid: $^1$H NMR (CDCl$_3$) 1.16 (d) 1.25 (q, J=8.77 Hz), 3.8 (m), 5, 6.75–6.73 and 7.29–7.49 (aromatic splitting); $^{13}$C NMR 15.19, 17.72, 64.54, 70.82, 72.7, 73.9, 115.96, 127.48, 127.72, 128.3, 153.58; Combustion Analysis: C; 75.7%, O; 16.45%.

EXAMPLE IV

This example illustrates the procedure for the preparation of the compound according to Formula I wherein R'' is ethyl.

To a 100 ml three neck flask flushed with argon and fitted with a septum and gas inlet tube connected to a mercury bubbler, was added 10 ml of absolute ethanol and 0.425 g of 10% palladium on carbon catalyst. The reaction mixture was then allowed to stir for at least thirty minutes under a positive pressure of hydrogen maintained by the bubbler. A solution of 0.425 g (1.49 mmol) of compound VII in 10 ml of ethanol was then added to the reaction flask via syringe. After three hours the reaction mixture was filtered through a ¼" pad of celite to remove the palladium. Ethanol was then removed by rotary evaporation and the product purified by flash chromatography on silica gel (3:4 hexanes/ethyl acetate) affording 0.28 g of pure product (96%) as a white solid (mp 83°-83.5° C.). IR phenol OH stretch 3500; $^1$H NMR (90 MHz) 1.35 (d), 1.4, 3.7, 4.55, 6.8 (ArH).

EXAMPLE V

This example illustrates the synthesis of those compounds of general Formula II via the coupling of Compound I with p-alkyloxybenzoyl chlorides. The specific illustrated synthesis is for Compound II wherein R is ethyl, and R' is n-decyl.

To a 250 ml three neck flask fitted with a magnetic stir bar and argon inlet was added 0.43 g of a 50% oil dispersion of NaH (9 mmol of NaH). The NaH was washed twice with dry n-pentane, then dried under a high flow or argon. Tetrahydrofuran (THF, 35 ml) was then added to the reaction vessel via syringe, followed by addition of 10 ml of a THF solution of 0.6 g (3.06 mmol) of compound I (R=ethyl) via syringe. The resulting mixture was allowed to stir for fifteen minutes, then 10 ml of a solution of 1.0 g (3.3 mmol) of p-decyloxybenzoylchloride was added via syringe. After 18 hours, the THF solvent was removed by vacuum rotary evaporation, and the reaction mixture quenched by addition of water. The resulting aqueous mixture was extracted with several portions of ether, and the combined organic extracts dried over anhydrous magnesium sulfate. Filtration, and removal of solvent by rotary evaporation gave a crude product which was purified by flash chromatography on silica gel (9:1 hexanes/ethyl acetate) affording 1.15 g (82%) of the new liquid crystal material II (R=ethyl, R'=n-decyl): $^1$H NMR (CDCl$_3$) 1.09-1.52 (alkyl region), 3.62 (q), 3.83 (m), 4.02 $^3$(m), 6.86-6.99 and 7.03-7.13 (arH); Mass spectrum 483.8 (7.83%), 290.8 (49.8%), 289.7 (100%), 121 (68.87%).

The following Table 1 gives the phase transition temperatures for several of the compounds according to general Formula II in order to illustrate the liquid crystal properties of the new compounds. For each compound in the table, two sets of data are given. The first set shows the phases and transition temperatures (in degrees centigrade) observed upon heating of the crystalline phase, and the second shows the phases and transition temperatures observed upon cooling of the isotropic liquid (X=crystal, L=isotropic liquid, A=smectic A phase, C*=ferroelectric smectic C phase, E=smectic E phase, I*=ferroelectric smectic I phase). A question mark in parentheses indicates that identification of the specific phase is tentative.

TABLE I

| R = methyl, R' = decyl | | | | | |
|---|---|---|---|---|---|
| X | 36.7 | A | 47.8 L | | |
| L | 47.8 | A | 27 C* 22.7 E(?) | ? | X |
| R = ethyl, R' = decyl | | | | | |
| X | 36.7 | A | 39.4 L | | |
| L | 39.4 | A | 21 C* 5 I*(?) | −4 | X |
| R = ethyl, R' = dodecyl | | | | | |
| X | 42 | A | 44 L | | |
| L | 44 | A | 30 C* | 29 | X |
| R = methyl, R' = dodecyl | | | | | |
| X | 43 | L | | | |
| L | 42 | A | remains A to room temperature | | |
| R = propyl, R' = decyl or dodecyl | | | | | |

TABLE I-continued liquid to room temperature

As shown in the table, the ferroelectric phases in these compounds are monotropic. Thus, for example, the compound wherein R=ethyl, and R'=decyl upon cooling of the isotropic liquid, is smectic C* from 21° C. to 5° C. This ferroelectric phase is stable for at least two days. However, it is monotropic (i.e. thermodynamically unstable), and the material recrystalizes eventually. This type of behavior is quite common among previously known liquid crystal materials as well.

When eutectic mixtures are prepared, a melting point depression occurs. In such mixtures, the monotropic phases exhibited by one or both of the pure components will often become thermodynamically stable. The existence of the monotropic phases shown in the table identify the compounds according to the present invention as very likely candidates for incorporation into liquid crystal compositions which would be suitable in a wide variety of ferroelectric liquid crystal applications.

Of course, while the present asymmetrical liquid crystal compounds have been defined in their pure state, the present invention is meant to encompass liquid crystal formulations in which the compounds of the present invention are used in mixture with one another, or formulations in which a compound of the present invention is used in mixture with other, previously known or unknown liquid crystal compounds.

From the foregoing description, one skilled in the art can easily ascertain the essential characteristics of my invention and without departing from the spirit and scope thereof, can make various changes and/or modifications to the invention for adapting it to various usages and conditions. Accordingly, such changes and modifications are properly intended to be within the full range of equivalents of the following claims.

Having thus described my invention and the manner and process of making and using it in such full, clear, concise, and exact terms as to enable any person skilled in the art to which it pertains, or with which it is most closely connected, to make and use the same, and having set forth the best modes for carrying out my invention:

I claim:

1. A compound of the formula:

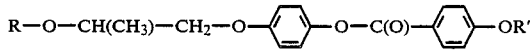

wherein R is a lower alkyl of one to three carbon atoms, and R' is an alkyl of nine to twelve carbon atoms.

2. The compound according to claim 1 wherein R is —CH$_3$.

3. The compound according to claim 1 wherein R is —CH$_2$—CH$_3$.

4. The compound according to claim 1 wherein R is —CH$_2$—CH$_2$—CH$_3$.

5. The compound according to claim 2 wherein R' contains 9 carbon atoms.

6. The compound according to claim 2 wherein R' contains 10 carbon atoms.

7. The compound according to claim 2 wherein R' contains 11 carbon atoms.

8. The compound according to claim 2 wherein R' contains 12 carbon atoms.

9. The compound according to claim 3 wherein R' contains 9 carbon atoms.

10. The compound according to claim 3 wherein R' contains 10 carbon atoms.

11. The compound according to claim 3 wherein R' contains 11 carbon atoms.

12. The compound according to claim 3 wherein R' contains 12 carbon atoms.

13. The compound according to claim 4 wherein R' contains 9 carbon atoms.

14. The compound according to claim 4 wherein R' contains 10 carbon atoms.

15. The compound according to claim 4 wherein R' contains 11 carbon atoms.

16. The compound according to claim 4 wherein R' contains 12 carbon atoms.

* * * * *

UNITED STATES PATENT AND TRADEMARK OFFICE
CERTIFICATE OF CORRECTION

PATENT NO. : 4,556,727
DATED : December 3, 1985
INVENTOR(S) : David M. Walba

It is certified that error appears in the above—identified patent and that said Letters Patent is hereby corrected as shown below:

Column 5, line 1, delete "1/4", and insert --3/4--.

Signed and Sealed this

Twenty-second Day of April 1986

[SEAL]

Attest:

DONALD J. QUIGG

Attesting Officer

Commissioner of Patents and Trademarks